(12) United States Patent
Kimura et al.

(10) Patent No.: US 9,365,684 B2
(45) Date of Patent: Jun. 14, 2016

(54) CELLULOSE LIQUID DISPERSION, METHOD FOR PRODUCING THE SAME, AND MOLDED BODY USING THE SAME

(75) Inventors: Mitsuharu Kimura, Misato (JP); Yumiko Oomori, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 681 days.

(21) Appl. No.: 13/634,362

(22) PCT Filed: Mar. 10, 2011

(86) PCT No.: PCT/JP2011/055665
§ 371 (c)(1),
(2), (4) Date: Sep. 12, 2012

(87) PCT Pub. No.: WO2011/114987
PCT Pub. Date: Sep. 22, 2011

(65) Prior Publication Data
US 2013/0000513 A1 Jan. 3, 2013

(30) Foreign Application Priority Data

Mar. 18, 2010 (JP) ................................ P2010-062264

(51) Int. Cl.
| | | |
|---|---|---|
| *C09D 101/02* | (2006.01) | |
| *C08J 3/05* | (2006.01) | |
| *C08B 15/04* | (2006.01) | |
| *C08J 3/09* | (2006.01) | |
| *C08J 3/11* | (2006.01) | |
| *C08L 1/04* | (2006.01) | |
| *D21H 11/16* | (2006.01) | |
| *D21H 11/20* | (2006.01) | |
| *D21H 15/02* | (2006.01) | |
| *D21H 21/14* | (2006.01) | |
| *D21H 27/10* | (2006.01) | |

(52) U.S. Cl.
CPC . *C08J 3/05* (2013.01); *C08B 15/04* (2013.01); *C08J 3/095* (2013.01); *C08J 3/11* (2013.01); *C08L 1/04* (2013.01); *D21H 11/16* (2013.01); *D21H 11/20* (2013.01); *D21H 15/02* (2013.01); *D21H 21/14* (2013.01); *D21H 27/10* (2013.01); *C08J 2301/04* (2013.01)

(58) Field of Classification Search
None
See application file for complete search history.

(56) References Cited

U.S. PATENT DOCUMENTS

2010/0272980 A1   10/2010   Kowata et al.

FOREIGN PATENT DOCUMENTS

| | | |
|---|---|---|
| CA | 2 705 970 | 6/2009 |
| JP | 2001-279016 | 10/2001 |
| JP | 2008001728 A * | 1/2008 |
| JP | 2008-274525 | 11/2008 |
| JP | 2008-297364 | 12/2008 |
| JP | 2009-161893 | 7/2009 |
| JP | 2009-209217 | 9/2009 |
| JP | 2009-263652 | 11/2009 |
| JP | 2009-298972 | 12/2009 |
| JP | 2009-299043 | 12/2009 |
| WO | WO 2009/021688 A1 | 2/2009 |

OTHER PUBLICATIONS

English translation of JP2008001728 (Oct. 2008).*
english translation of JP2009161893 (2009).*
International Search Report of PCT/JP2011/055665 mailed Apr. 12, 2011.
Extended European Search Report dated Jul. 16, 2015 in corresponding European Patent Application No. 11756173.8.
European Patent Office Action dated Mar. 10, 2016 in corresponding European Patent Application No. 11 756 173.8.

* cited by examiner

*Primary Examiner* — Melvin C Mayes
*Assistant Examiner* — Stefanie Cohen

(57) ABSTRACT

(Purpose) A cellulose liquid dispersion is provided wherein a particle diameter peak of obtained fine cellulose can be controlled if mechanical treatment of oxidized cellulose is performed; and a molded body is also provided wherein the molded body is generated from the dispersion, has sufficient flexibility and gas bather characteristics. (Solution) A cellulose liquid dispersion is provided, wherein the cellulose liquid dispersion at least includes fine oxidized cellulose, wherein a volume-based particle size distribution of the fine oxidized cellulose exists in the range of 0.01 μm or more and 100 μm or less of volume-based particle diameter, and the two or more particle diameter peaks. Furthermore, a molded body is formed using the cellulose liquid dispersion.

15 Claims, No Drawings

US 9,365,684 B2

CELLULOSE LIQUID DISPERSION, METHOD FOR PRODUCING THE SAME, AND MOLDED BODY USING THE SAME

CROSS-REFERENCE TO RELATED APPLICATIONS

This application is a U.S. National Stage application of PCT/JP2011/055665 filed Mar. 10, 2011 and claims the foreign priority benefit of Japanese Application No. 2010-062264 filed Mar. 18, 2010 in the Japanese Intellectual Property Office, the contents of both of which are incorporated herein by reference.

TECHNICAL FIELD

The present invention relates to a cellulose liquid dispersion, a method of producing the same, and a molded body using the same. Concretely, the present invention relates to a cellulose liquid dispersion which has a variety of particle sizes, a manufacturing method of the same, and a molded body of the cellulose.

BACKGROUND ART

Cellulose is included in the cell walls of plants, exocrine secretions of microbes, mantles of sea squirts, and the like. Cellulose is a polysaccharide wherein the number thereof is the largest known on earth, and cellulose is a biodegradable material, has high crystallinity and is excellent in stability and safety, and cellulose has gained attention as an environmentally friendly material. Accordingly, cellulose is expected to be applied and developed in various fields.

Cellulose has strong intramolecular hydrogen bonding and high crystallinity. Therefore, cellulose hardly dissolves in water nor general solvents, and studies have been performed to increase the solubility thereof. Among them, a method has gained a great deal of attention in recent years wherein a primary hydroxyl group existing at the C6 position among three hydroxyl groups of cellulose is merely oxidized to form an aldehyde group or a ketone group and then the group is changed to a carboxyl group by the catalyst system of TEMPO (2,2,6,6-tetramethyl piperidin oxyradical), since the method can oxidize merely a primary hydroxyl group selectively and can be performed under mild conditions such as aqueous solvents and ordinary temperature. Furthermore, when TEMPO oxidation is performed on natural cellulose, it is possible to merely oxidize the crystal surface thereof in nano-scale order, while the crystallinity of cellulose is maintained. It is known that fine modified cellulose can be dispersed in water merely by cleaning, dispersing in water and performing simple mechanical treatment. For example, an invention is described in Patent Document 1 wherein cellulose is oxidized by a TEMPO oxidation reaction, and forms fine cellulose due to the subsequent mechanical treatment.

PRIOR ART DOCUMENTS

Patent Documents

Patent Document 1: Japanese Unexamined Patent Application, First Publication No. 2009-263652

DISCLOSURE OF INVENTION

Problem to be Solved by the Invention

However, in the method of Patent Document 1, merely the particle diameter of cellulose before becoming finely divided cellulose is described, and an extra-high-pressure homogenizer is used to form fine cellulose. Accordingly, merely the narrow peak of the particle diameter is obtained wherein almost all the cellulose has been extremely divided to be fine particles (50 μm or less) in the volume size distribution. Since the cellulose has a small particle size and is fine, it is possible, for example, to show gas barrier characteristics when the cellulose is used as a gas barrier agent to form a coating or a film. However, there is possibility that a fragile film is formed since cracks or the like may be formed since such a film has poor flexibility.

Therefore, the present invention is achieved based on the aforementioned problems. The purpose of the present invention is to provide a cellulose liquid dispersion wherein a particle diameter peak of fine cellulose obtained can be controlled even after mechanical treatment of oxidized cellulose; and a molded body which has sufficient flexibility and gas barrier characteristics, and does not cause cracks or the like when fine cellulose is molded.

Means for Solving the Problem

As means for solving the aforementioned problems, the invention described provides a cellulose liquid dispersion, characterized in that the cellulose liquid dispersion at least includes fine oxidized cellulose, wherein a volume-based particle size distribution of the fine oxidized cellulose exists in a range of 0.01 pm or more and 100 pm or less of a volume-based particle diameter, and has two or more diameter peaks of particles.

Furthermore, the invention described provides the cellulose liquid dispersion disclosed, characterized in that the fine oxidized cellulose is cellulose which is obtained by oxidizing and finely dividing natural cellulose having a crystalline structure of cellulose type I.

Furthermore, the invention described provides the cellulose liquid dispersion disclosed, characterized in that the fine oxidized cellulose has a carboxyl group, and the amount of the carboxyl group is 1.0 mmol/g or more and 2.0 mmol/g or less.

Furthermore, the invention described provides the cellulose liquid dispersion disclosed, characterized in that the volume-based particle size distribution has one of or two or more particle diameter peaks in the range of 0.01 pm or more and 1 pm or less of a volume-based particle diameter, and has one of or two or more particle diameter peaks in the range of 1 pm or more and 100 pm or less of a volume-based particle diameter.

Furthermore, the invention described provides the cellulose liquid dispersion disclosed, characterized in that a dispersion medium of the cellulose liquid dispersion is one kind of or two or more kinds of solvents selected from water, methanol, ethanol and isopropyl alcohol.

Furthermore, the invention described provides a molded body which is produced from the cellulose liquid dispersion described.

Furthermore, the invention described provides a molded body which is produced by coating the cellulose liquid dispersion described on a base material and drying the coated dispersion.

Furthermore, the invention described provides a method of producing a cellulose liquid dispersion which at least includes fine oxidized cellulose, wherein the method includes: a step of oxidizing cellulose to form oxidized cellulose; a step of dispersing the oxidized cellulose in a dispersion medium and finely dividing the oxidized cellulose to form a cellulose liquid dispersion including fine oxidized cellulose, wherein a volume-based particle size distribution of the fine oxidized cellulose exists in the range of 0.01 pm or more and 100 pm or less of volume-based particle diameter and has two or more particle diameter peaks.

Furthermore, the invention described provides the method of producing a cellulose liquid dispersion described, wherein a means of finely dividing the oxidized cellulose is an ultrasonic homogenizer.

Furthermore, the invention described provides the method of producing a cellulose liquid dispersion described, wherein, in the step in which the cellulose liquid dispersion is formed, the oxidized cellulose is finely divided to form two or more kinds of dispersions of fine oxidized cellulose, wherein a volume-based particle size distribution of the fine oxidized cellulose exists in the range 5 of 0.01 pm or more and 100 pm or less of volume-based particle diameter and has two or more diameter peaks of particles; and the cellulose liquid dispersion is formed by mixing the two or more kinds of dispersions.

Effects of the Invention

According to the present invention, it is possible to obtain a cellulose liquid dispersion including fine oxidized cellulose which has two or more particle diameter peaks. Furthermore, when a cellulose liquid dispersion of the present invention is used as a gas barrier agent to form a coating or a film, a flexible film can be formed wherein sufficient gas barrier properties are maintained and cracks or the like are hardly generated, since cellulose having variable diameters exists in the film.

BEST MODE FOR CARRYING OUT THE INVENTION

Hereinafter, the present invention is explained in detail.

A cellulose liquid dispersion of the present invention is a dispersion wherein volume-based particle size distribution of fine oxidized cellulose included in the liquid has two or more particle diameter peaks. Here, the volume-based particle size distribution means a distribution wherein the distribution of particles included in a cellulose liquid dispersion is measured based on the volume standard. Furthermore, a volume-based particle diameter means a diameter wherein particles included in a cellulose liquid dispersion are measured based on the volume standard. Furthermore, a particle diameter peak is a peak of the volume-based particle size distribution. Here, fine oxidized cellulose included in a cellulose liquid dispersion of the present invention has solid forms such as fibrous form, particle form, non uniform shaped form and, especially, fibrous form, and therefore a volume-based particle diameter is used to determine the size of fine oxidized cellulose.

A cellulose liquid dispersion of the present invention includes two or more kinds of fine oxidized cellulose wherein particle diameter peaks are different from each other. Accordingly, when a film is formed using the fine oxidized cellulose liquid dispersion, two or more kinds of oxidized fine cellulose overlap each other, and therefore it is possible to obtain a film which has flexibility while gas barrier properties are maintained.

Furthermore, it is preferable that in a cellulose liquid dispersion of the present invention, a volume-based particle size distribution of the fine oxidized cellulose included in the liquid exist in the range of 0.01 μm or more and 100 μm or less of a volume-based particle diameter. When the above range is satisfied, excellent transparency is achieved in the visible light region (400 to 700 nm).

Furthermore, it is preferable that a cellulose liquid dispersion of the present invention have the volume-based particle size distribution of fine oxidized cellulose in the cellulose liquid dispersion, wherein one of or two or more particle diameter peaks exist in the range of 0.01 μm or more and 1 μm or less of a volume-based particle diameter, and one of or two or more particle diameter peaks exist in the range of 1 μm or more and 100 μm or less of a volume-based particle diameter. It is desirable that fine oxidized cellulose which is 0.01 μm or more and 1 μm or less be laminated compactly in order to obtain a film which shows gas barrier properties, and it is preferable that a film be structured with a still more larger fine oxidized cellulose (1 μm or more and 100 μm or less) in order to provide flexibility to the film. It is unpreferable to use fine oxidized cellulose having a small diameter alone, since a fragile film is formed wherein the strength thereof with respect to the bending direction is poor. On the other hand, it is unpreferable to use fine oxidized cellulose having a large diameter alone, since the transparency of a film becomes poor and it becomes difficult to obtain gas barrier properties due to an increase of spaces generated between cellulose. In the cellulose liquid dispersion of the present invention, particles which have variable diameters from small to large size coexist so that small fine oxidized cellulose fills the spaces between large fine oxidized cellulose. Therefore, it is possible to generate a film which has flexibility while gas barrier properties are maintained. It is particularly preferable that one particle diameter peak exist in a range of 0.01 μm or more and 1 μm or less of a volume-based particle diameter, and two or more particle diameter peaks exist in a range of 1 μm or more and 100 μm or less of a volume-based particle diameter.

Fine oxidized cellulose included in a cellulose liquid dispersion of the present invention has a carboxyl group, and the amount of the carboxyl group is preferably 1.0 mmol/g or more and 2.0 mmol/g or less. When the amount is less than 1.0 mmol/g, sufficient electrostatic repulsion does not occur if mechanical treatment is subsequently performed, and it becomes difficult to disperse fine oxidized cellulose uniformly. Accordingly, problems such as poor transparency of a liquid dispersion occur. Furthermore, when the amount exceeds 2.0 mmol/g, decomposition of cellulose occurs severely at the time of dispersion, and problems such yellowing tend to occur. When the amount of a carboxyl group of fine oxidized cellulose is in the range of 1.0 mmol/g to 2.0 mmol/g, the cellulose liquid dispersion is excellent in transparency and decomposition or the like of the dispersion can be prevented. It is particularly preferable that fine oxidized cellulose of the present invention have a carboxyl group on the surface thereof. When carboxyl groups exist on the surface of the fine oxidized cellulose, sufficient electrostatic repulsion can be caused between fine oxidized cellulose.

It is preferable that a mean volume particle diameter of fine oxidized cellulose included in a cellulose liquid dispersion of the present invention be 0.01 μm or more and 50 μm or less. When the diameter is in said range, both strength and gas barrier properties of a film can be achieved. Here, a mean volume particle diameter is an average of particle diameters, wherein particles included in a cellulose liquid dispersion are measured based on a volume standard.

Next, steps of modifying cellulose to form oxidized cellulose are explained.

Oxidized cellulose is obtained by oxidization of cellulose. As a raw material of cellulose which is oxidized, a wood pulp, a nonwood pulp, a wastepaper pulp, a cotton, bacteria cellulose, valonia cellulose, sea squirt cellulose, fine cellulose, microcrystalline cellulose and the like can be used. Particularly, natural cellulose having a crystalline structure of cellulose type-I is preferable. When natural cellulose having a crystalline structure of cellulose type-I is used, it is possible to oxidize cellulose, while a crystalline region which is believed to show gas barrier properties is maintained.

As a method of oxidizing cellulose, a method is desirable wherein a re-oxidant is used in the presence of an N-oxyl compound which has high selectivity with respect to a primary hydroxyl group, while the structure of cellulose is maintained as much as possible in comparatively mild aqueous conditions. As the aforementioned N-oxyl compound, 2,2,6,6-tetramethyl-1-piperidin-N-oxyl (TEMPO) and the like can be used preferably.

Furthermore, as the aforementioned re-oxidant, any oxidant can be used in so far as the oxidant can carry out an oxidation reaction, and examples of the re-oxidant include halogen, a hypohalogenous acid, a halogenous acid, a perhalogenic acid, salts thereof, a halogen oxide, a nitrogen oxide, a peroxide or the like. From the viewpoint of reactivity and ease of availability, sodium hypochlorite is preferable.

Furthermore, the oxidation reaction can proceed smoothly and an introduction ratio of a carboxyl group can be improved, when the oxidation reaction is performed under the existence of a bromide or iodide.

Any amount of TEMPO, which is used as the N-oxyl compound, is sufficient, in so far as the amount enables TEMPO to function as a catalyst. As the bromide, those wherein sodium bromide or lithium bromide is used are preferable, and sodium bromide is more preferable from the viewpoint of cost and stability. Any usage amount of a re-oxidant, bromide and iodide is sufficient, in so far as the usage amount can promote the oxidation reaction. It is desirable that the reaction be performed at pH of 9 to 11. However, as the reaction proceeds, carboxyl groups are generated, and pH of the reaction mixture decreases. Therefore, it is necessary to maintain pH of the reaction mixture at 9 to 11.

The reaction mixture can be maintained to alkaline, by gradually adding an aqueous alkaline solution so that pH of the reaction mixture is maintained to the predetermined value. As the aqueous alkaline solution, sodium hydroxide, lithium hydroxide, potassium hydroxide, an aqueous ammonium solution, and organic alkalis such as tetramethylammonium hydroxide, tetraethylammonium hydroxide, tetrabutylammonium hydroxide and benzyltrimethylammonium hydroxide can be used. From the viewpoint of cost, sodium hydroxide is preferable.

In order to complete the oxidation reaction, it is necessary to finish the reaction of re-oxidant completely by adding another alcohol while pH of the reaction mixture is maintained. As the added alcohol, one having a low molecular weight such as methanol, ethanol, isopropyl alcohol or the like is preferable, since the reaction can finish rapidly. Ethanol is more preferably used from the viewpoint of safety of a by-product which is generated by the reaction.

As a method for cleaning the oxidized pulp to which oxidation has been performed, there are a method wherein cleaning is performed while alkaline and salt exist; a method wherein cleaning is performed such that a carboxyl group is formed due to addition of acid; a method wherein cleaning is performed by adding an organic solvent to eliminate undesired materials, and the like. From the viewpoint of handling ability, yield and the like, the method wherein cleaning is performed such that a carboxyl group is formed due to addition of acid is preferable. As a cleaning solvent, water is preferably used.

Next, a step of finely dividing the oxidized cellulose to prepare a cellulose liquid dispersion of the present invention is explained.

As the method of finely dividing the oxidized cellulose, first of all, oxidized cellulose is immersed in a dispersion medium, and pH of the formed liquid dispersion is adjusted. For example, when oxidized pulp to which acid cleaning has been performed is dispersed in water, pH of the liquid dispersion is about 4 to 6, and therefore, pH thereof is adjusted to 6 to 12 using alkali.

It is preferable that a dispersion medium used in the present invention be one kind of or two or more kinds of solvents selected from water, methanol, ethanol and isopropyl alcohol. When such a solvent is used, it is possible to increase a drying speed of a liquid dispersion, improve wettability of a liquid dispersion, decrease viscosity and the like.

In addition, as an alkali which can be used, sodium hydroxide, lithium hydroxide, potassium hydroxide, an ammonia aqueous solution, organic alkalis such as tetramethylammonium hydroxide, tetraethylammonium hydroxide, tetrabutylammonium hydroxide and benzyltrimethylammonium hydroxide can be cited. Sodium hydroxide is preferable from the viewpoint of cost or the like.

In addition, as a mechanical method for finely dividing the oxidized cellulose, a dispersing device such as an ultrasonic homogenizer, a high pressure homogenizer, an extra-high-pressure homogenizer, ball mill, roll mill, cutter mill, planetary mill, jet mill, attritor, grinder, juicer mixer, homomixer, nanogenizer, a device using counter collision in water, and the combination of two or more of the dividing machines can be used for finely dividing the cellulose. By performing a finely dividing treatment as described above for a predetermined period, a liquid cellulose dispersion including finely divided oxidized cellulose having a carboxyl group at the C6 position can be obtained.

In order to obtain a cellulose liquid dispersion which includes finely divided oxidized cellulose having two or more particle diameter peaks, it is effective to perform intensive mechanical treatment of a part of a liquid dispersion. As a method for performing intensive mechanical treatment, a method wherein conventional mechanical treatment can be used. However, a method using an ultrasonic homogenizer is particularly preferable. It is possible to partially and extremely divide oxidized cellulose when an ultrasonic homogenizer is used.

Furthermore, in order to obtain a cellulose liquid dispersion which includes finely divided oxidized cellulose having two or more peaks of particle diameter, a total volume-based particle diameter of oxidized cellulose is decreased to some extent by performing any of the aforementioned mechanical methods which finely divide oxidized cellulose. Then, mechanical treatment is further performed step-by-step by any means to obtain a cellulose liquid dispersion including finely divided oxidized cellulose, which has two or more particle diameter peaks and has a small volume-based particle diameter as a whole.

In addition, it is also possible to generate a cellulose liquid dispersion which includes finely divided oxidized cellulose having two or more particle diameter peaks, when two or more of liquid dispersions having variable particle peaks are mixed, which are generated by the aforementioned mechanical method of finely dividing oxidized cellulose. Cellulose fiberization processes differ from each other according to methods used for finely dividing. Therefore, it is possible to obtain a dense film structure and to achieve flexibility due to the combination selected.

In addition, it is also possible to obtain a cellulose liquid dispersion wherein two or more particle diameter peaks exist, when a kind of dispersion medium which is used for finely dividing oxidized cellulose is changed. For example, when alcohol-based solvent such as methanol, ethanol or isopropyl alcohol is added to water to prepare a solvent and the amount of the alcohol is controlled, a cellulose liquid dispersion which includes fine oxidized cellulose having a desired particle peak can be obtained.

A molded body of the present invention is formed by coating or casting a cellulose liquid dispersion of the present invention on a base material, and drying the coated or casted dispersion. General examples of the molded body include a film-like molded body and a sheet-like molded body. However, other variable examples such as an injection-molded body, an extruded product and a molded body which have a cup-like, a bottle-like, a tape-like, a hollow product-like, a pipe-like, a tube-like, a rod-like structure or the like can also be cited.

As the aforementioned base material, a plastic material can be used. Examples of the plastic material include: polyester-based materials such as polyethylene terephthalate (PET) and polyethylenenaphthalate (PEN); polyolefine-based materials such as polyethylene and polypropylene; a polystyrene film; polyamides such as nylon; polycarbonate; polyacrylonitrile (PAN); polyimide, and the like. Furthermore, as the plastic material, polyvinyl chloride, cellulose, triacetyl cellulose, polyvinyl alcohol, polyurethane and the like also can be used. In addition, it is also possible to use a plastic material which includes one or more kinds of the aforementioned plastic materials as a component, includes one or more kinds of the aforementioned plastic materials as a copolymer component, or includes a chemically-modified material of the aforementioned plastic materials.

Furthermore, as the aforementioned base material, it is possible to use a base material which is derived from natural materials. As a base material derived from natural materials, a polylactic acid, biopolyolefine, hydroxy alkanoate and the like may be used. Furthermore, paper which is obtained by steps such as pulping and paper-machining of wood, plant or the like can also be used.

As a coating method of a cellulose liquid dispersion of the present invention, a coating method can be used wherein a comma coater, a roll coater, a reverse roll coater, a direct gravure coater, reverse gravure coater, offset gravure coater, a roll kiss coater, a reverse kiss coater, a micro gravure coater, an air doctor coater, a knife coater, a bar coater, a wire bar coater, a die coater, a dip coater, a blade coater, a brush coater, a curtain coater, a slot die coater, or the like is used. As a method for obtaining a molded body, as well as a method wherein a coating agent is coated on a base material which has been molded, there are a method wherein a coating film which is formed on a molded base material is removed to obtain a film-like or sheet-like molded body which consists of a single coating layer, and a method wherein a film or a sheet material is obtained by casting.

EXAMPLES

Hereinafter, the present invention is explained in detail based on examples, but the technical scope of the present invention is not limited by the embodiments below.

First of all, oxidized pulp which is used in Examples and Comparative Examples is explained based on manufacturing examples.

(Manufacturing Example)
TEMPO Oxidation of Pulp 0.3 g of TEMPO and 3 g of sodium bromide was dissolved in 200 g of distilled water to form a solution, the solution was added to a suspension, wherein 30 g of softwood bleached kraft pulp had been mixed with 1800 g of distilled water and was cooled to 20° C. To the suspension, 172 g of an aqueous solution of sodium hypochlorite, which was 2 mol/L, had a density of 1.15 g/ml and had been adjusted to pH 10 with 1N of hydrochloric acid, was added to start an acid reaction. A temperature of the reaction mixture was continuously maintained at 20° C., and pH of the reaction mixture was maintained at pH 10 by adding a 0.5 N aqueous solution of sodium hydroxide when pH decreased in the reaction. When sodium hydroxide was 2.85 mmol/g with respect to mass of cellulose, a sufficient amount of ethanol was added to the reaction mixture to stop the reaction. Then, hydrochloric acid was added to the reaction mixture to be pH 3, and cleaning was performed sufficiently by repeating cleaning by distilled water to obtain oxidized pulp.

(Evaluation of a Carboxyl Group of Oxidized Pulp)

0.1 g of oxidized pulp as a solid weight, which was obtained in the manufacturing example, was measured and dispersed in water so that the concentration of the pulp was 1%. Then, hydrochloric acid was added to the dispersion to be pH 3. Subsequently, the ratio of a carboxyl group (mmol/g) was measured by the conductometric titration method wherein a 0.5 N aqueous solution of sodium hydroxide was used, and it was found that the ratio was 1.6 mmol/g.

Next, cellulose liquid dispersions of Examples and Comparative Examples are explained.

Example 1

Dispersion of Oxidized Pulp 1 g of oxidized pulp of the aforementioned manufacturing example was dispersed in 99 g of distilled water, and pH thereof was set to pH 10 using an aqueous solution of sodium hydroxide. Finely dividing treatment of the prepared liquid dispersion was performed for 15 minutes using an ultrasonic homogenizer to obtain a 1% cellulose liquid dispersion.

Example 2

A 1% cellulose liquid dispersion was obtained similar to Example 1, except that the finely dividing treatment was performed for 10 minutes.

Example 3

A 1% cellulose liquid dispersion was obtained similar to Example 1, except that a mixture of distilled water and ethanol (distilled water:ethanol=8:2) was used as a dispersion medium.

Example 4

0.5 g of the oxidized pulp obtained in the aforementioned manufacturing example was dispersed in 49.5 g of distilled water, and adjusted to pH 10 using an aqueous solution of sodium hydroxide. Finely dividing treatment of the prepared liquid dispersion was performed for 60 minutes using a juicer mixer to obtain a 1% cellulose liquid dispersion. Furthermore, another 1% cellulose liquid dispersion was obtained by performing similar treatment except that a treatment period of finely dividing was 10 minutes. These liquid dispersions were mixed to prepare a 1% cellulose liquid dispersion.

Example 5

0.5 g of the oxidized pulp obtained in the aforementioned manufacturing example was dispersed in 49.5 g of distilled water, and adjusted to pH 10 using an aqueous solution of sodium hydroxide. The prepared liquid dispersion was treated using an extra-high pressure homogenizer so that ten passing treatments were performed under 200 MPa to prepare a 1% cellulose liquid dispersion. Furthermore, another 1% cellulose liquid dispersion was obtained by performing similar treatment except that ten passing treatments were performed under 100 MPa. These liquid dispersions were mixed to prepare a 1% cellulose liquid dispersion.

Comparative Example 1

1 g of oxidized pulp of the aforementioned manufacturing example was dispersed in 99 g of distilled water, and pH thereof was set to pH 10 using an aqueous solution of sodium hydroxide. Finely dividing treatment of the prepared liquid dispersion was performed for 60 minutes using a juicer mixer to obtain a 1% cellulose aqueous dispersion.

Comparative Example 2

A 1% cellulose liquid dispersion was obtained similar to Example 1, except that a period of finely dividing treatment was 3 minutes.

Comparative Example 3

A 1% cellulose liquid dispersion was obtained such that 1 g of oxidized pulp of the aforementioned manufacturing example was dispersed in 99 g of distilled water, and finely dividing treatment of the prepared dispersion was performed for 60 minutes using a juicer mixer without performing pH adjustment.

Next, evaluation methods of films are explained which were prepared using the cellulose liquid dispersions of Examples and Comparative Examples.

(Measurement of Volume-Based Particle Size Distribution)

Measurement of the cellulose liquid dispersions of Examples 1 to 5 and Comparative Examples 1 to 3 was performed with a laser diffraction particle size analyzer (SALD-7000H, manufactured by Shimadzu corporation). Concentration adjustment and measurement were performed such that about 200 ml of pure water was circulated in a cell and a sample was added drop-wise in the cell to achieve a measureable concentration. Particle peak positions and a mean volume particle diameter measured are shown in Table 1.

TABLE 1

| | Particle diameter peaks | | | Mean volume particle diameter |
|---|---|---|---|---|
| | (1) | (2) | (3) | |
| Example 1 | 0.120 μm | 4.610 μm | 17.850 μm | 3.523 μm |
| Example 2 | 0.341 μm | 14.625 μm | 41.364 μm | 10.475 μm |
| Example 3 | 0.225 μm | 8.611 μm | 27.075 μm | 6.437 μm |
| Example 4 | 0.109 μm | 33.344 μm | — | 18.892 μm |
| Example 5 | 0.074 μm | 0.297 μm | — | 0.212 μm |
| Comparative Example 1 | 0.109 μm | — | — | 0.145 μm |
| Comparative Example 2 | 55.467 μm | 141.457 μm | 241.540 μm | 196.216 μm |
| Comparative Example 3 | 39.319 μm | 139.168 μm | 202.389 μm | 177.630 μm |

(Oxygen Transmission Rate)

The cellulose liquid dispersions of Examples 1 to 5 and Comparative Examples 1 to 3 were coated on PET films having a thickness of 12 μm, wherein one surface of the film had been corona treated, with a #20 wire bar coater, and dried sufficiently with an oven at 120° C. The oxygen transmission rate of the PET films having the dried coating was measured with MOCON OX-TRAN 2/21 manufactured by MODERN CONTROLS, INC., in an atmosphere of 25° C. and 5% RH.

(Viscoelasticity of a Film)

The predetermined amount of each of the cellulose liquid dispersions of Examples 1 to 5 and Comparative Examples 1 to 3 was filled in a square-shaped case made of polystyrene, and was heated for 18 hours in an oven at 50° C. to form a 15 μm cast film. The obtained film was sliced to form a sample having a width of 10 mm and a height of 20 mm, and measurement of viscoelasticity (50 mN) was performed by tensile mode with a viscoelasticity measuring apparatus (EXSTAR DMS 100, manufactured by SII NanoTechnology Inc.) at a frequency of 1 Hz, a rate of temperature rise of 2° C./min and a temperature range of 20° C. to 180° C. E' at 25° C. was obtained.

(Measurement of Transmittance)

Light transmittance of the cellulose liquid dispersions of Examples 1 to 5 and Comparative Examples 1 to 3 was measured. The cellulose liquid dispersions were provided in sample cells made of quartz so that no air bubbles entered the dispersion, and light transmittance at 600 nm at an optical path length of 1 cm was measured with a spectrophotometer (NRD-1000, manufactured by JASCO Corporation)

Results of the oxygen transmission rate, the viscoelasticity of a film and the measurement of transmittance are shown in Table 2.

TABLE 2

| | Oxygen transmission rate cc/m2 · atm · day | E' MPa | Measurement of transmittance % (600 nm) |
|---|---|---|---|
| Example 1 | 0.32 | $2.1 \times 10^2$ | 95 |
| Example 2 | 0.40 | $1.9 \times 10^2$ | 90 |
| Example 3 | 0.37 | $2.5 \times 10^2$ | 91 |
| Example 4 | 0.33 | $2.3 \times 10^2$ | 88 |
| Example 5 | 0.24 | $2.6 \times 10^2$ | 95 |
| Comparative Example 1 | 0.31 | $5.3 \times 10^2$ | 95 |
| Comparative Example 2 | 1.21 | $3.1 \times 10^2$ | 77 |
| Comparative Example 3 | 1.35 | $2.9 \times 10^2$ | 71 |

As shown in the results of Table 1, it was confirmed that cellulose liquid dispersions were generated such that plural peaks of particle diameter existed within a range of volume-based particle size, of from 0.01 μm or more and 100 μm or less.

Furthermore, as shown in the results of Table 2, it was confirmed that, when cellulose liquid dispersions were used which had plural particle diameter peaks within a range of volume-based particle size, of from 0.01 μm or more and 100 μm or less, films which had flexibility were formed while maintaining the film oxygen transmission rate and transmittance thereof.

INDUSTRIAL APPLICABILITY

As described above, a cellulose dispersion and a molded body which are obtained by the present invention are excellent in gas barrier characteristics and flexibility, and therefore, they can be applied for various fields such as a container or a wrapping material which is used for food, toiletries, medicine, medical supplies, electronic components and the like.

The invention claimed is:

1. A cellulose liquid dispersion comprising:
   fine oxidized cellulose having a volume-based particle size distribution in a range of 0.01 μm or more and 100 μm or less of volume-based particle diameter, the volume-based particle size distribution having
   one of or two or more of particle diameter peaks in a range of 0.01 μm or more and 1 μm or less of a volume-based particle diameter, and
   one of or two or more of particle diameter peaks in a range of 1 μm or more and 100 μm or less of volume-based particle diameter.

2. The cellulose liquid dispersion according to claim 1, wherein the fine oxidized cellulose is cellulose which is obtained by oxidizing and finely dividing natural cellulose having a crystalline structure of cellulose type I.

3. The cellulose liquid dispersion according to claim 2, wherein the fine oxidized cellulose has a carboxyl group, and the amount of the carboxyl group is 1.0 mmol/g or more and 2.0 mmol/g or less.

4. The cellulose liquid dispersion according to claim 1, wherein a dispersion medium of the cellulose liquid dispersion is one kind of or two or more kinds of solvents selected from water, methanol, ethanol, and isopropyl alcohol.

5. A molded body which is produced from the cellulose liquid dispersion according to claim 4.

6. A molded body which is produced by coating the cellulose liquid dispersion according to claim 4 on a base material and drying the coated dispersion.

7. A method of producing a cellulose liquid dispersion which at least includes fine oxidized cellulose, the method of producing a cellulose liquid dispersion comprising:
   oxidizing cellulose to form oxidized cellulose; and
   dispersing the oxidized cellulose in a dispersion medium and finely dividing the oxidized cellulose to form a cellulose liquid dispersion including fine oxidized cellulose, wherein a volume-based particle size distribution of the fine oxidized cellulose exists in the range of 0.01 μm or more and 100 μm or less of volume-based particle diameter and has two or more diameter peaks of particles, such that the volume-based particle size distribution has one of or two or more of particle diameter peaks in the range of 0.01 μm or more and 1 μm or less of a volume-based particle diameter and has one of or two or more of particle diameter peaks in the range of 1 μm or more and 100 μm or less of volume-based particle diameter,
   the dispersing the oxidized cellulose performs one of processes (i), (ii), and (iii) to finely divide the oxidized cellulose and generate the cellulose liquid dispersion:
   (i) performing intensive mechanical treatment of a part of a liquid dispersion after the dispersion medium and the oxidized cellulose are mixed to form the liquid dispersion,
   (ii) performing step-by-step processing which includes:
   mixing the dispersion medium and the oxidized cellulose to form the liquid dispersion; treating the liquid dispersion with a dispersing device to form a fine oxidized cellulose mechanically, until a total volume-based particle diameter of the oxidized cellulose is decreased to some extent, and further treating the obtained liquid dispersion with another dispersing device to finely divide the oxidized cellulose mechanically, and
   (iii) preparing two or more liquid dispersions, which have different particle diameter peaks, and mixing the two liquid dispersions to form the cellulose liquid, wherein two or more different conditions are used to form the two liquid dispersions when the oxidized cellulose is finely divided mechanically in a dispersion medium.

8. The method of producing a cellulose liquid dispersion according to claim 7, wherein the finely dividing the oxidized cellulose includes ultrasonic homogenizing.

9. The method of producing a cellulose liquid dispersion according to claim 7, wherein, in the forming of the cellulose liquid dispersion, the oxidized cellulose is finely divided to form two or more kinds of dispersions of fine oxidized cellulose, wherein the volume-based particle size distribution of the fine oxidized celluloses exists in the range of 0.01 μm or more and 100 μm or less of volume-based particle diameter and has two or more diameter peaks of particles; and the cellulose liquid dispersion is formed by mixing the two or more kinds of dispersions.

10. The cellulose liquid dispersion according to claim 1, wherein the fine oxidized cellulose has a carboxyl group at the C6 position.

11. The method of producing a cellulose liquid dispersion according to claim 7, wherein the fine oxidized cellulose has a carboxyl group at the C6 position.

12. The method of producing a cellulose liquid dispersion according to claim 7, wherein in the oxidizing cellulose to form oxidized cellulose is, cellulose is oxidized in the presence of 2,2,6,6-tetramethyl-1-piperidin-N-oxyl, oxidant, and one of a bromide and iodide.

13. The method of producing a cellulose liquid dispersion according to claim 12, the method further including, between the oxidizing and the dispersing, in this order:
   adding alcohol to finish the oxidizing step while pH of the mixture obtained in the oxidizing step is maintained,
   adding acid to the mixture, and
   washing the oxidized cellulose after the acid has been added.

14. The method of producing a cellulose liquid dispersion according to claim 7, wherein the dispersing the oxidized cellulose in a dispersion medium includes immersing the oxidized cellulose a dispersion medium to form a dispersion, and a pH of the formed dispersion is adjusted to 6 to 12.

15. The method of producing a cellulose liquid dispersion according to claim 12, wherein the oxidizing cellulose to form oxidized cellulose is performed while maintaining pH of the mixture at 9 to 11.

* * * * *